(12) United States Patent
Smith et al.

(10) Patent No.: US 8,736,821 B2
(45) Date of Patent: May 27, 2014

(54) SYSTEM AND METHOD FOR MONITORING BENDING OF A FLEXIBLE RISER

(75) Inventors: Russell Smith, Southampton (GB); Ian Pierce, Eastleigh (GB); Azedine Kacher, Paris (FR); Damon Roberts, Southampton (GB); Vincent Alliot, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 607 days.

(21) Appl. No.: 12/963,985

(22) Filed: Dec. 9, 2010

(65) Prior Publication Data
US 2011/0176125 A1 Jul. 21, 2011

Related U.S. Application Data

(63) Continuation-in-part of application No. PCT/EP2009/058002, filed on Jun. 25, 2009.

(60) Provisional application No. 61/075,822, filed on Jun. 26, 2008.

(51) Int. Cl.
| | | |
|---|---|---|
| *G01B 11/16* | (2006.01) | |
| *E21B 47/00* | (2012.01) | |
| *G01L 1/24* | (2006.01) | |
| *G01M 5/00* | (2006.01) | |
| *E21B 17/01* | (2006.01) | |
| *E21B 47/12* | (2012.01) | |
| *G01D 5/353* | (2006.01) | |

(52) U.S. Cl.
CPC ............ *E21B 47/0006* (2013.01); *G01L 1/246* (2013.01); *G01B 11/165* (2013.01); *G01M 5/0025* (2013.01); *E21B 17/017* (2013.01); *E21B 47/123* (2013.01); *G01D 5/353* (2013.01); *G01M 5/0066* (2013.01)
USPC .......................................................... 356/32

(58) Field of Classification Search
None
See application file for complete search history.

(56) References Cited

U.S. PATENT DOCUMENTS

| | | | |
|---|---|---|---|
| 7,277,162 B2 * | 10/2007 | Williams | ........................ 356/32 |
| 2003/0117025 A1 | 6/2003 | Rouquette | |
| 2004/0113104 A1 * | 6/2004 | Maida, Jr. | ...................... 250/573 |
| 2006/0045408 A1 * | 3/2006 | Jones et al. | ...................... 385/12 |
| 2006/0071158 A1 * | 4/2006 | Van Der Spek | .......... 250/227.14 |

(Continued)

FOREIGN PATENT DOCUMENTS

| | | |
|---|---|---|
| EP | 1672344 | 6/2006 |
| EP | 1840501 A2 | 10/2007 |

(Continued)

OTHER PUBLICATIONS

Search Report from the equivalent GB patent application No. 1021178.7 issued on Apr. 25, 2012.

(Continued)

*Primary Examiner* — Michael A Lyons
*Assistant Examiner* — Juan D Valentin, II
(74) *Attorney, Agent, or Firm* — Chamberlain Hrdlicka

(57) ABSTRACT

A system and method for monitoring bending curvature of a flexible pipe structure, including at least one conduit configured to conform to a profile of a bend stiffener of a flexible pipe structure, and the at least one conduit including one or more sensors, wherein each sensor is configured for measuring a bending curvature of the bend stiffener.

18 Claims, 6 Drawing Sheets

(56) References Cited

U.S. PATENT DOCUMENTS

2006/0115335 A1* 6/2006 Allen et al. ............ 405/274
2008/0047662 A1* 2/2008 Dria et al. ............ 156/249
2008/0121427 A1  5/2008 Berg
2008/0204706 A1* 8/2008 Magne et al. ............ 356/32

FOREIGN PATENT DOCUMENTS

| EP | 1635034 | 6/2009 |
| EP | 2065551 | 6/2009 |
| WO | 0000799 | 1/2000 |
| WO | 2006003308 A1 | 1/2003 |

OTHER PUBLICATIONS

Search Report from the equivalent GB patent application No. 1021178.7 issued Nov. 12, 2012, 4 pages.

OTC 19051, Roberts et al., "Fatigue Monitoring of Flexible Risers Using Novel Shape-Sensing Technology", Offshore Technology Conference, Apr. 30-May 3, 2007, Houston, TX, 6 pages.

* cited by examiner

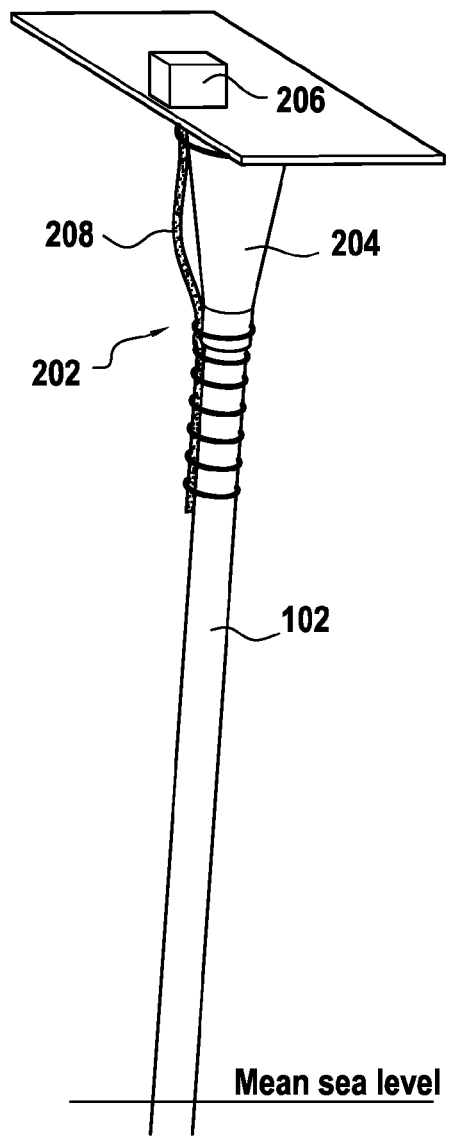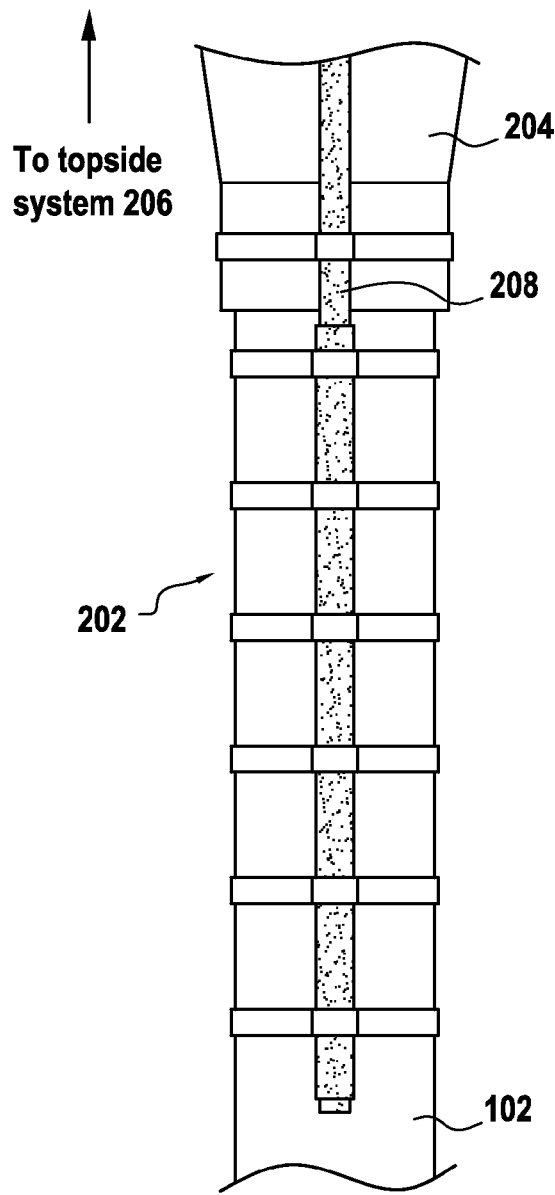
FIG.2
FIG.3

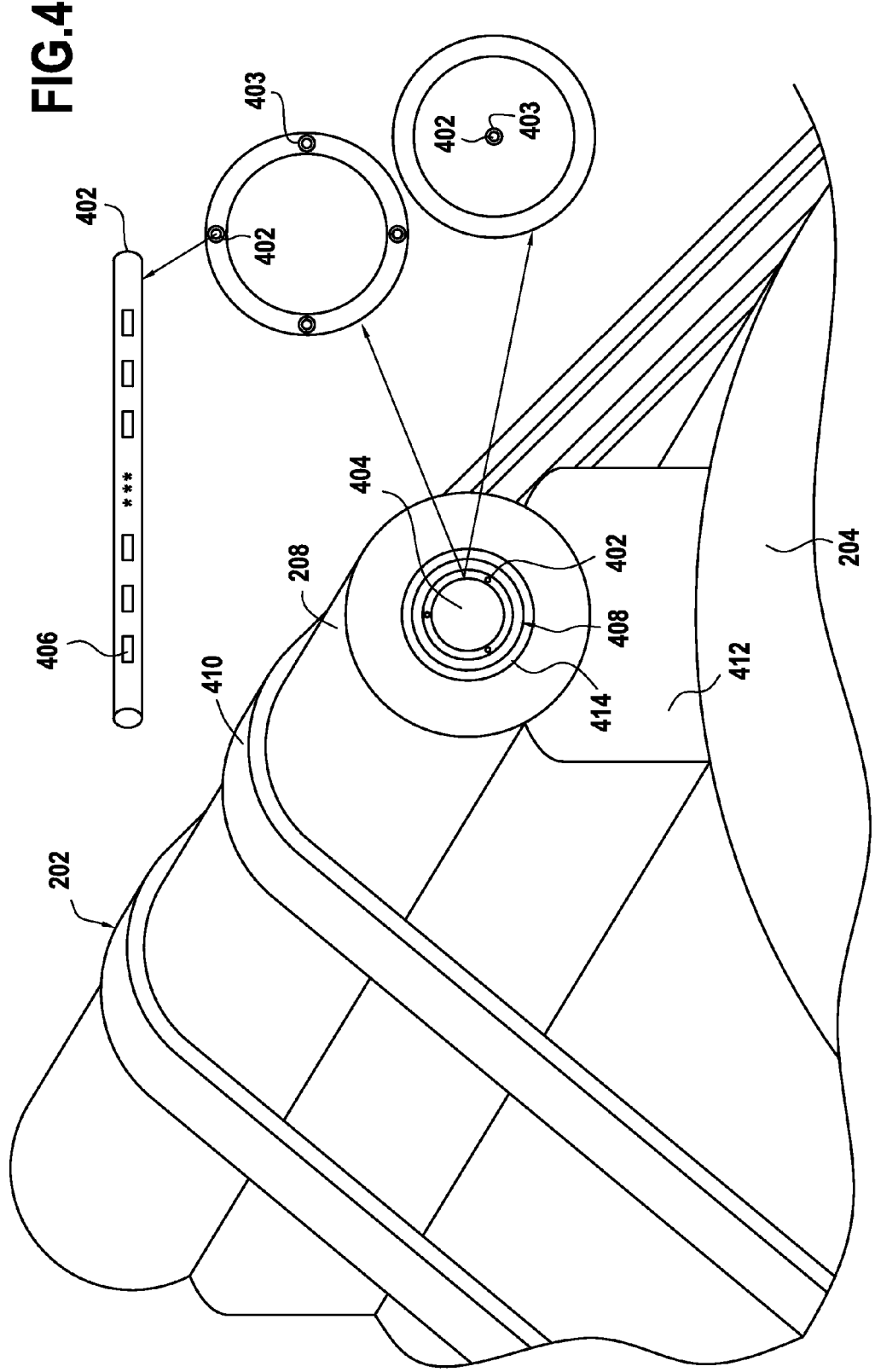

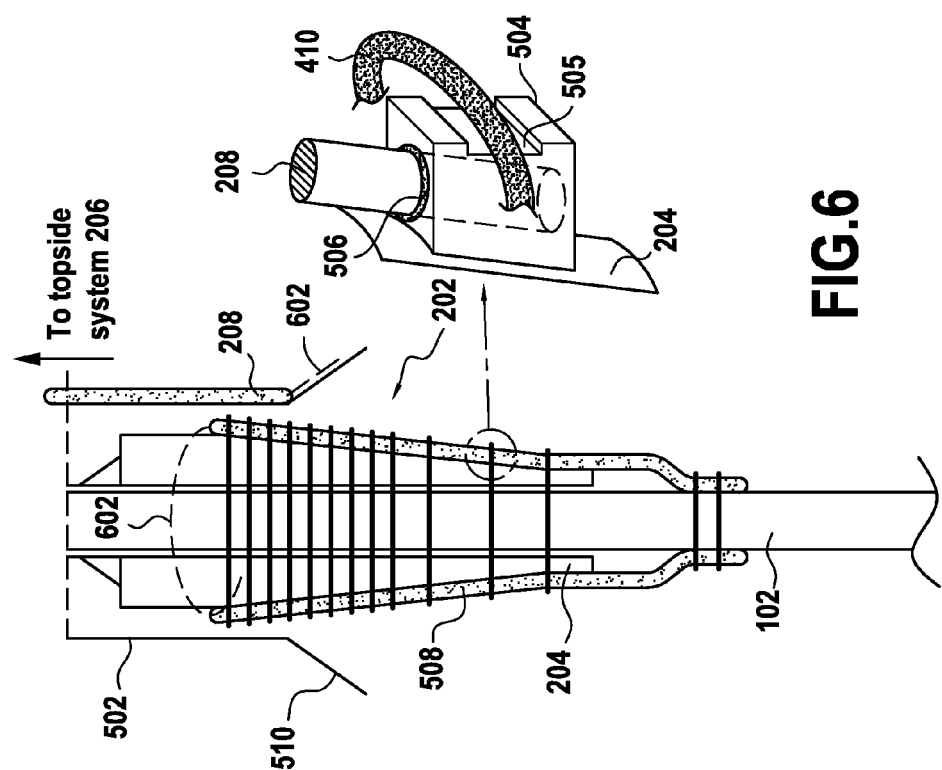
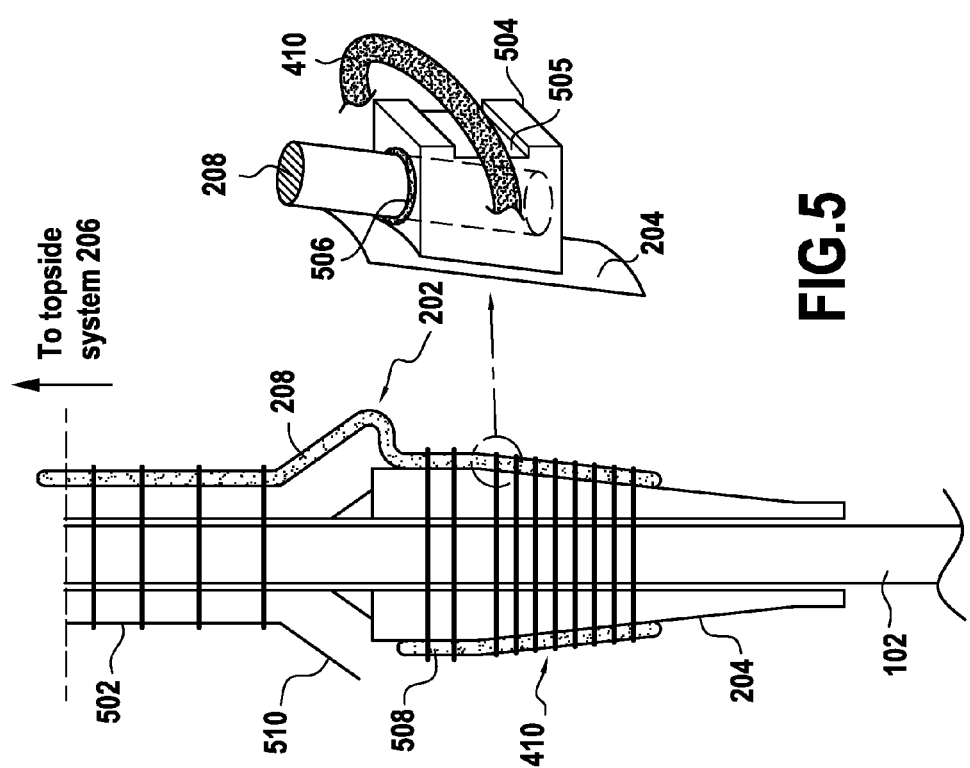

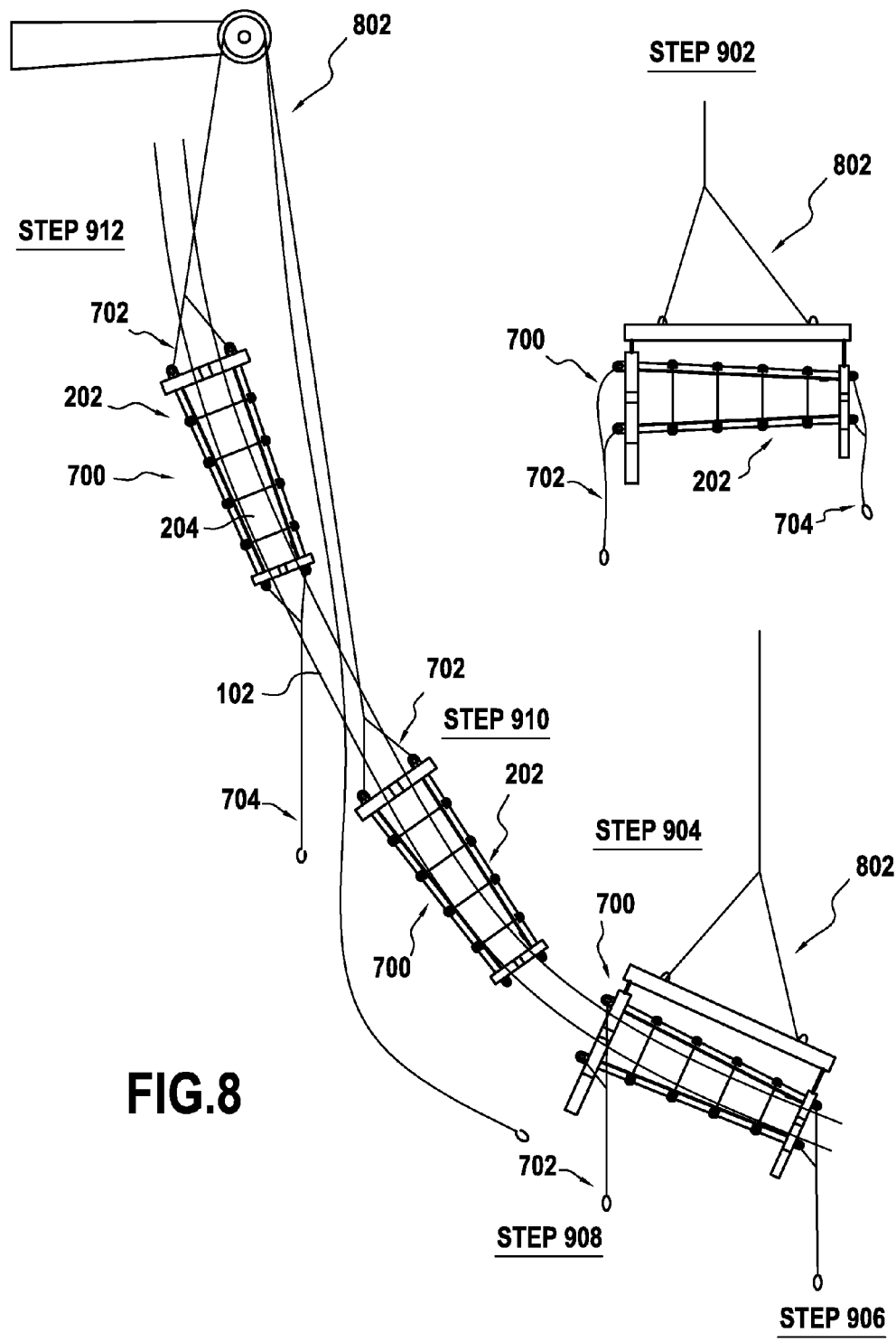

SYSTEM AND METHOD FOR MONITORING BENDING OF A FLEXIBLE RISER

CROSS REFERENCE TO RELATED APPLICATIONS

This invention and application is related to and is a continuation-in-part of International Patent Application No. PCT/EP2009/058002, entitled "SYSTEM AND METHOD FOR MONITORING BENDING OF A FLEXIBLE RISER," filed on 25 Jun. 2009, which in turn claims the benefit of priority from U.S. Provisional Patent Application Ser. No. 61/075,822, entitled "FLEXIBLE RISER BENDING SENSOR," filed on Jun. 26, 2008. The entire content of all of the aforementioned applications are hereby incorporated by reference herein.

TECHNICAL FIELD

The invention generally relates to systems and methods for structural integrity monitoring, and in particular to a system and method for monitoring bending curvature of flexible risers or pipes, umbilicals, bend stiffeners and the like.

DISCUSSION OF THE BACKGROUND

Flexible risers are commonly used in offshore oil and gas installations to connect surface and subsea facilities. The flexible riser is either a flexible pipe or an umbilical. Flexible risers (which also may be referred to herein as flexible pipes) convey hydrocarbons and ancillary fluids, and conventionally have a multilayered construction. The layers include fluid barriers, helical armoring, anti-wear, and specialized layers that depend on the application (e.g. thermal insulation). An umbilical houses control lines that supply power, communications, fluid injection or lift and normally include armoring layers. Flexible refers to compliant bending whilst the axial and torsional stiffness is comparatively high.

FIG. 1 shows exemplary flexible riser 102 configurations 104-114 between offshore surface and subsea facilities. The riser 102 is compliant in bending which is a key advantage of flexible riser constructions. The riser design requires careful assessment of the bending in cases of extreme and fatigue loading, which may cause radial bending of up to 5 meters (16.5 feet) or more. Design procedures are available for this purpose. In-situ monitoring can have a key role in design critical applications (extreme or fatigue) where the safety of the design requires surveillance data to confirm its validation or evidence to support remedial action.

The location of the bend sensitive locations is dependent on the riser configuration and environmental loading from external and internal sources. These locations may include interface zones (e.g., a connection point, wherein a hard interface includes a point where the load is transferred from one structure to another, etc.) with surface (topside) and subsea structures, hog and sag bends (e.g., wherein a hog bend is a hump like bend or the opposite of a sag bend) and adjacent sections of the riser 102. The flexible riser 102 is normally supported with a bend stiffener (e.g., a tapered section that limits the bending of a flexible riser) or rigid bellmouth (e.g., a curved section for guiding the flexible riser along a stiff predefined curve) in the interface zones. Other bend limiter devices are also available in less onerous applications. However, bend stiffeners, and the like, are designed to last a certain number of years based on numerical modeling, but not on actual monitoring of bends. As such, the design life of flexible risers with bend stiffeners, when engineered, is typically conservative, and the actual monitoring of bending stress can be used to extend the life of flexible risers with bend stiffeners and other bend limiter devices. Therefore, there is a need to extend the life of flexible risers, bend stiffeners, and the like.

SUMMARY OF THE DISCLOSURE

The above and other needs and problems are addressed by the exemplary embodiments of the present invention, which provide a novel system and method for monitoring bending curvature of flexible riser pipes, umbilicals, and the like. In an exemplary embodiment, the bending monitor system and method can be retrofitted to an outside wall of a bare section of a flexible riser, bend stiffener, and the like. Advantageously, the exemplary method and system can be used for (i) monitoring time histories of bending strains on bare sections of flexible pipes, and the like, or at bend stiffeners, and the like, converting the bending strains to curvature in two orthogonal planes, and (ii) applying the bending curvature in surveillance systems for monitoring extreme bending and fatigue life, and the like. Flexible riser as used in the context of the present invention can include any suitable flexible pipes, umbilicals, conduits, ancillary bend stiffeners, and the like.

Accordingly, in an exemplary aspect of the present invention there is provided a system and method for monitoring bending curvature of a flexible pipe structure, including at least one conduit configured to conform to a profile of a bend stiffener of a flexible pipe structure, and the at least one conduit including one or more sensors, wherein each sensor is configured for measuring a bending curvature of the bend stiffener.

Still other aspects, features, and advantages of the present invention are readily apparent from the entire description thereof, including the figures, which illustrate a number of exemplary embodiments and implementations. The invention is also capable of other and different embodiments, and its several details can be modified in various respects, all without departing from the spirit and scope of the invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 2 illustrates an exemplary layout of a flexible riser bend monitoring system placed partially below a bend stiffener;

FIG. 3 illustrates an exemplary strapping configuration for the bend monitoring system of FIG. 2;

FIG. 4 illustrates further details of the exemplary bend monitoring system of FIGS. 2-3;

FIG. 5 illustrates an exemplary layout of the bend monitoring system of FIGS. 2-4 when placed on a bend stiffener that does not enter an I-tube;

FIG. 6 illustrates an exemplary layout of the bend monitoring system of FIGS. 2-4 when placed on a bend stiffener that does enter an I-tube;

FIG. 8 is used to illustrate an exemplary method for retrofitting the harness of FIGS. 7A-7B onto a bend stiffener of a flexible pipe.

DETAILED DESCRIPTION

Figure 1:
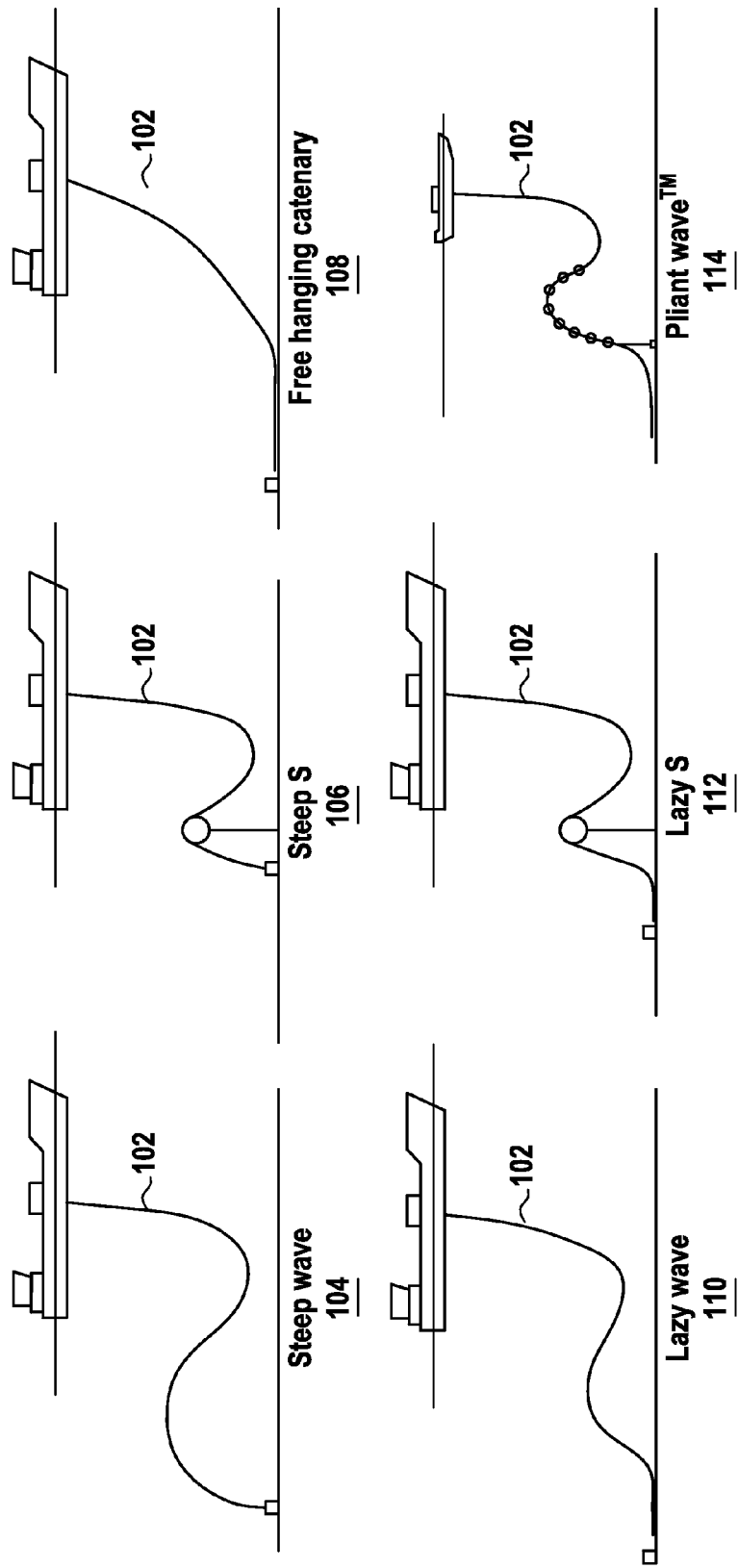
FIG. 1 illustrates exemplary flexible riser configurations between offshore surface and subsea facilities.

Various embodiments and aspects of the invention will now be described in detail with reference to the accompanying figures. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited. Further, whenever a composition, a group of elements or any other expression is preceded by the transitional phrase "comprising," "including" or "containing," it is understood that we also contemplate the same composition, the group of elements or any other expression with transitional phrases "consisting essentially of," "consisting," or "selected from the group of consisting of," preceding the recitation of the composition, the elements or any other expression. The term "system" may also be referred to herein as "apparatus."

Referring now to the drawings, wherein like reference numerals designate identical or corresponding parts throughout the several views, and more particularly to FIGS. 2-4 thereof, there is illustrated an exemplary layout of a flexible riser 102 bend monitor 202 (which also may be referred to herein as a bend monitoring system, or curvature monitor 202) placed partially below and around a bend stiffener/taper joint 204. A topside system 206 includes electronics, such as optoelectronics components (not shown), that support one or more sensors for measuring deformation, change in position, motion (translational or angular), acceleration, strain, or the like. Such sensors may include, but are not limited to, accelerometers (not shown), gyrometers (not shown) or optical fibers 402 embedded to a protective rod 404 (e.g., preferably made of a non-corrosive material, such as polypropylene (PP), Polyamide 11 (PA11) and Polyamide 12 (PA12), polyurethane (PU) and the like) inside a conduit 208. The optical fibers 402 may also include a protective sheath 403 (e.g., made from polyurethane or the like).

In an exemplary embodiment, the conduit 208 provides a link between the topside system 206 and the lower-end of the bend monitor 202. Moreover, the conduit 208 functions to transfer the deformation of the bend stiffener/taper joint 204 or flexible riser 102 to the sensors (e.g. optical fibers 402). The conduit 208 is shown to be secured to a hub and a tip of the bend stiffener/taper joint 204 and is otherwise free to comply with the bending motion between these locations. Although, FIGS. 2-3 show the bend monitor 202 located on the flexible riser 102, the bend monitor 202 can also be located on the bend stiffener/taper joint 204, as will be further described. It should also be noted that the topside system 206 may be adapted to wirelessly communicate with the bend monitor 202 by such communication means known to an ordinary person skilled in the art (e.g. electromagnetic, acoustic, infrared, Bluetooth, and the like).

In an exemplary embodiment, four of the optical fibers 402 can be embedded around the protective rod 404 (which also may be referred to herein as a slender protective rod 404), as shown in FIG. 4, advantageously, allowing measurement of bending in all directions. In a further exemplary embodiment, a single optical fiber 402 can be embedded in the center of the protective rod 404, also as shown in FIG. 4.

One example of a sensing component of a bend monitor includes the protective rod 404 (also referred to as a "SubCrod"), which may comprise one or more surface embedded optical fibers 402 that include one or more Fiber Bragg Gratings (FBGs) 406. The FBGs 406 are scores or gratings internal to the optical fibers 402 used to measure the wavelength of reflected light, wherein the longer the wavelength, the greater the strain. The protective rod 404 has one or more surface layers 408 (e.g., a heat shrink sleeve around the protective rod 404, a Teflon layer around the sleeve, and a galvanized steel, stainless steel, non-corrosive material, etc., layer around the Teflon layer, and the like) that protect the optical fibers 402. The FBGs 406 measure bending strain at several axial stations along the axis of the protective rod 404 with compensation for non-bending effects. The strain at each station may be measured at a plurality of angular locations, such as the bend stiffener/taper joint 204 of the flexible riser 102, around the circumference of the protective rod 404 via the one or more optical fibers 402. The strain at each station is converted to bending curvature of the protective rod 404 in two orthogonal planes. The protective rod 404 may be integrated with optoelectronics components (not shown) that include laser, optical interrogation, cabling, data acquisition and software, and the like, which receive the data measured by the FBGs 406 and convert it, as discussed above.

The protective rod 404 may be mechanically coupled to the bend stiffener/taper joint 204 of the flexible riser 102 using components described as follows. The protective rod 404 is housed inside the protective conduit 208 that can be strapped with a plurality of straps 410 to the bend stiffener/taper joint 204 via an interface pad 412, which is in contact with and coupled to the bend stiffener/taper joint 204. Advantageously, the interface pad 412 can be adapted to ensure that the bending of the bend stiffener/taper joint 204 is substantially transferred to the conduit 208 by providing a distance between the protective rod 404 and the surface of the bend stiffener/taper joint 204 and by providing a contoured mating surface on the interface pad for coupling to the bend stiffener/taper joint 204. The material of interface pad 412 preferably has similar elasticity, flexibility, and like, as the bend stiffener/taper joint 204 and can be made of polypropylene (PP), for example, when the bend stiffener/taper joint 204 is made of polyurethane (PU).

The conduit 208 can be adapted to be compliant in bending and radially stiff. The conduit 208 readily bends with the flexible riser 102 and protects the protective rod 404 against direct loading from the straps 410 and mechanical impact. The gap between the protective rod 404 and an inside wall of the conduit 208 should be small so the difference between the bending curvature of the conduit 208 and the protective rod 404 is minimized.

The protective rod 404 can be anchored to the conduit 208 at one or more locations 414 (e.g., via adhesive, heat shrinking, melting, etc.), which depend on the application. Example anchor points 414 include the topside, bottom location or mid-length of the conduit 208. In an exemplary embodiment, the protective rod 404 is free to move/slide inside the conduit 208 to correspond with the bending motion. The sliding motion is generally small and increases with distance from the anchor points 414.

The interface pad 412 is preferably adapted to ensure that the bending of the flexible riser 102 is substantially transferred to the conduit 208 in all planes of bending. This can be achieved by shaping the pad 412 to provide effective distributed contact with the flexible riser 102 and conduit 208. The interface pad 412 can either be a single long piece or a set of short multiple blocks depending on the application.

The strain sensing stations can commence below the tip of the bend stiffener/taper joint 204 as the conduit 208 is strapped to the interface pad 412. The conduit 208 may be adapted to house the optical link between the topside system 206 and the start of the bend monitor 202 on the interface pad 412.

Mechanical coupling of the bend monitor 202 to the tapered surface of the bend stiffener/taper joint 204 may employ a variety of arrangements. The arrangement is typically influenced by the interface between the bend stiffener and a topside structure, which may include an I-tube or J-tube.

FIG. 5 shows a mechanical coupling arrangement with the bend stiffener/taper joint 204 where the hub of the bend stiffener/taper joint 204 is partially below an exit trumpet 510 (or bellmouth) of an I-tube 502. I-tubes are typically made of steel and typically extend a small distance below the baseline of the host vessel or platform, and are employed to provide protection on the side of the vessel, to protect the flexible riser 102 from having objects dropped therein, and to guide the flexible riser 102 during installation. J-tubes can also be employed, and are typically used for platforms and are curved in the shape of a "J," but otherwise function similar to the I-tube. The exit trumpet or bellmouth 510 protects the connection between the I-tube 502 and the flexible riser 102.

The conduit 208 can provide a continuous structural link between the topside system 206 optoelectronic components and the lower-end of the bend monitor 202. The conduit 208 is firmly anchored via the straps 410 to the cylindrical hub of the bend stiffener/taper joint 204. The straps 410 below this point keep the conduit 208 snuggly secured to the tapered profile of the bend stiffener/taper joint 204.

The interface pad 412 can include multiple lugs 504 that accommodate a tapered surface for the bend stiffener/taper joint 204 and a cylindrical surface for the straps 410. Moreover, the lugs 504 may include grooves 505 to better secure the straps 410 and to prevent excessive movement of the straps 410, advantageously, preventing damage due to movement of the straps 410. Clamps 506 can be provided on the conduit 208 above and below each of the lugs 504. Effective mechanical coupling between the bend stiffener/taper joint 204 and the conduit 208 is thus provided. Circumferential symmetry around the bend stiffener/taper joint 204 is normally employed and achieved by using two or more conduits 208, wherein only one conduit 208 need employ the strain-sensing protective rod 404 and connect to the topside system 206. The other conduits 508 are empty and need not connect with the topside system 206.

The strain-sensing protective rod 404 may be anchored inside the conduit 208 via the anchor points 414 at the hub of the bend stiffener/taper joint 204 or at the lower-end of the bend monitor 202. The protective rod 404 is optically coupled to a cable (not shown) at the hub of the bend stiffener/taper joint 204. The cable is routed around the trumpet 510 of the I-tube 502 to the topside system 206.

FIG. 6 shows a mechanical coupling arrangement with the bend stiffener/taper joint 204 where the hub of the bend stiffener/taper joint 204 is inside the I-tube 502. Access restrictions prevent firmly anchoring the conduit 208 to the cylindrical hub of the bend stiffener/taper joint 204. The anchor location is on the riser 102 below the tip of the bend stiffener/taper joint 204. The conduit 208 runs up the bend stiffener/taper joint 204 and may be snuggly secured to the tapered profile using the interface lugs 504 along with circumferential symmetry of the mechanical coupling to ensure substantially uniform tension distribution using the empty conduits 508, as described with respect to FIG. 5.

The strain-sensing protective rod 404 may be anchored via anchor points 414 inside the conduit 208 at the upper or lower ends of the bend monitor 202. The protective rod 404 can be optically coupled at the upper-end of the bend monitor 202, and routed outside the I-tube 502, around the trumpet 510 to the topside system 206, via a cable 602.

In an exemplary embodiment, the monitoring is mostly performed near the vessel at the bend stiffener/taper joint 204 because this is a critical point for breakage. In further exemplary embodiments, sensors other than optical fiber based sensors, or in addition thereto, can be employed, for example, including accelerometer based sensors (e.g. micro-, nano-, piezo-electric accelerometers, and the like), sensors utilizing gyrometers, or any sensors that can measure a range of motion (translational or angular), movement, deformation, acceleration, strain, and the like. Such sensors may incorporate built-in software for computing various useful outputs.

The exemplary embodiments can be used to accurately measure the deformation of the bend stiffeners 204. Although the bend stiffeners 204 are well known, the exemplary embodiments, advantageously, allow for the external monitoring of the deformation of such existing bend stiffeners 204, for example, to determine any degradation thereof, remaining life span, and the like, and with a monitoring system that can be retrofitted and removed.

Figures 7A, 7B:
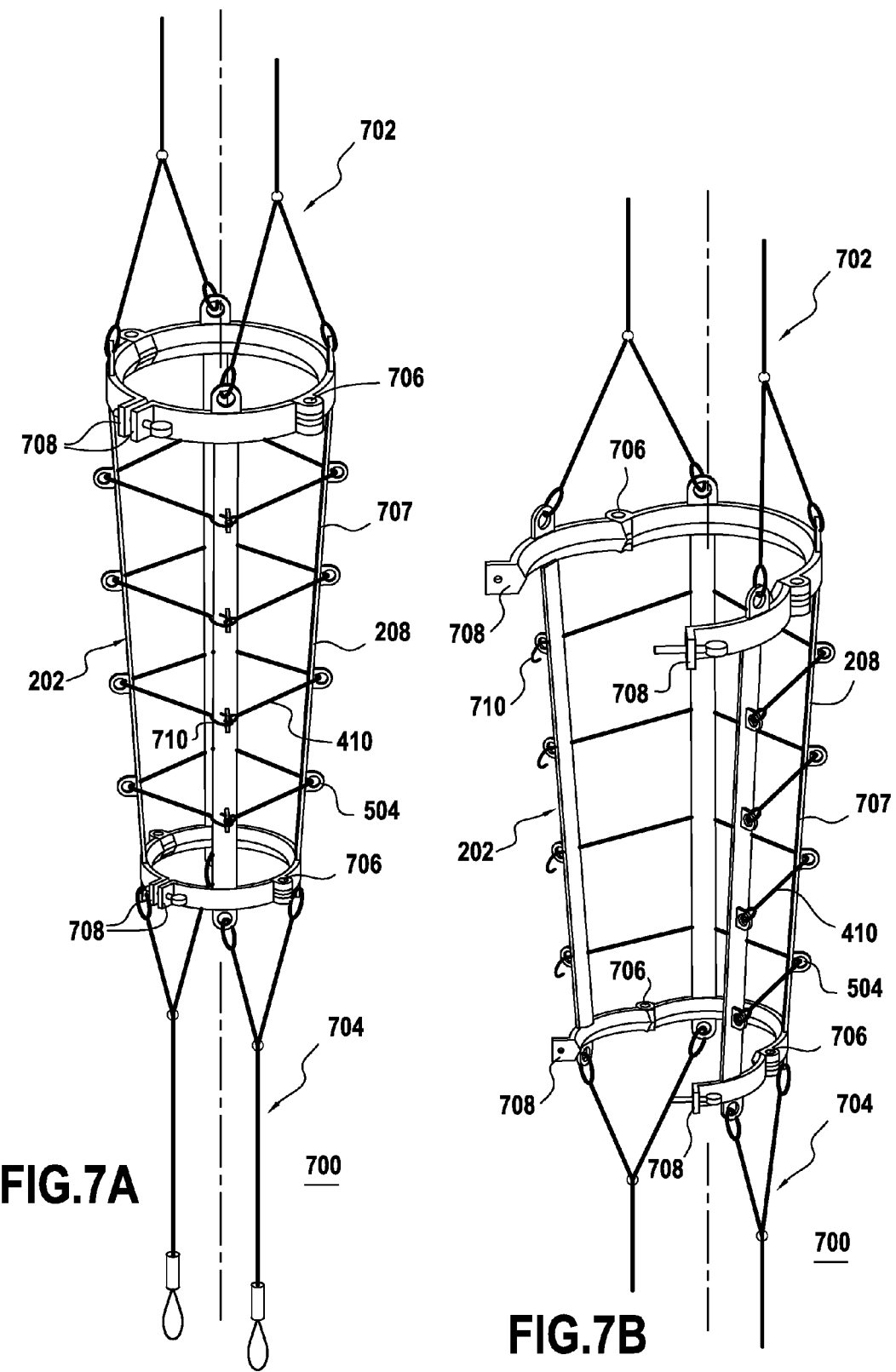
FIGS. 7A-7B illustrate an exemplary configuration of a harness for the bend monitoring system of FIGS. 2-6 in a closed position (FIG. 7A) and in an open position (FIG. 7B)

FIGS. 7A-7B illustrate an exemplary configuration of a harness 700 for housing the bend monitor 202 of FIGS. 2-6 in a closed position (FIG. 7A) and in an open position (FIG. 7B). In FIGS. 7A-7B, the harness 700 with the bend monitor 202 is configured for retrofitting onto an existing bend stiffener, for example, by employing a remotely operated vehicle (ROV, not shown), divers (not shown), and the like. In addition, to the components previously described with respect to FIGS. 2-6, the harness 700 with the bend monitor 202 further includes pull up wires 702, pull down wires 704, clamps 706 having locking means 708 (e.g., clasp based, bolt and nut based, etc.), and straps 410, for example, configured as bungee type cords having hooks 710 for securing onto the lugs 504.

Thus, the harness 700 serves as an instrumentation/sensor support harness to facilitate the retrofitting and installation of the bend monitor 202 on the bend stiffener/taper joint 204 of the flexible pipe or umbilical or a taper joint of an SCR (Steel Catenary Riser). The harness 700 may be adapted to facilitate the numerous sensors described herein for measuring a range of motion, movement, deformation, acceleration, strain, and the like. Typically, the harness 700 includes rigid upper and lower clamps 706 to suit the upper and lower part of the bend stiffener/taper joint 204. The upper and lower clamps 706 can be tied together by several bands 707, for example, made of flexible material (e.g., polyurethane). The bands 707 can also be used as support for the various components (e.g., measuring sensors, fiber optics, accelerometers, and the like) of the bend monitor 202, which can be embedded, glued or fitted by any appropriate means onto the bands 707. The several elastic straps or bungee cords 410 can be installed around and along the bands 707 in order to keep them in close contact with the pipe 102 or the bend stiffener/taper joint 204, so that the bands 707 conform to the contours of the bend stiffener/taper joint 204 profile. The upper and lower clamps 706 are equipped with locking means 708 to secure the harness 700 once it is fully engaged over the bend stiffener/taper joint 204. Such locking means 708 can be activated either directly by ROV, diver or remotely by an operator from the surface. The upper clamp of the clamps 706 can also be used as support for electronics (not shown), for example, to collect and transfer data and provide power supply to the subsea sensors of the bend monitor 202 integrated onto the bands 707. The harness 700 also can be equipped with an umbilical (not shown) from the surface to provide electrical power, wired or wireless data transfer, or optical fiber light interrogation from the topside system 206.

FIG. 8 is used to illustrate an exemplary method for retrofitting harness 700 with the bend monitor 202 of FIGS. 7A-7B onto the bend stiffener/taper joint 204 of the flexible pipe 102. In FIG. 8, at Step 902, the harness 700 is deployed in the open position, as shown in FIG. 7B, below the bend stiffener/taper joint 204, using a handling frame 802 and winch 804. At Step 904, the harness 700 is positioned over the flexible pipe 102 at a water depth suitable for safe and efficient ROV or diver intervention (e.g., at approximately 50 meters below the surface) employing an ROV (not shown), diver, and the like. At Step 906, the clamps 706 of the harness 700 are closed and secured around the flexible pipe 102 by the ROV, the handling frame 802 is removed by the ROV, and the handling frame 802 is recovered by the winch 804. At Step 908, the pull up wires 702 of the harness 700 are attached to the winch 804 and the bungee cords 410 are installed around the bands 707 by the ROV. At Step 910, the harness 700 is pulled up along the flexible pipe 102 by the winch 804 towards the bend stiffener/taper joint 204 and the harness 700 is passed over to bend stiffener/taper joint 204, wherein the pulling operation stops when the upper clamp 706 reaches the upper part of the bend stiffener/taper joint 204 and is fully engaged onto the bend stiffener/taper joint 204. At Step 912, the clamps 706 can then be locked and secured by activating the locking means 708 and a survey can be performed to verify that bands 707 are in contact with the bend stiffener/taper joint 204 profile, and including coupling the bend monitor 202 to the topside system 206, completing the process. The harness 700 with bend monitor 202 can be removed by reversing the installing steps and with use of the pull down wires 704, wherein a clamp weight (not shown) attached to the pull down wires 704 can be used to pull down the harness 700 away from the bend stiffener/taper joint 204 so that the harness 700 can be opened and recovered to surface.

While the inventions have been described in connection with a number of exemplary embodiments, and implementations, the inventions are not so limited, but rather cover various modifications, and equivalent arrangements, which fall within the scope of the appended claims.

What is claimed is:

1. A system for monitoring bending curvature of a flexible pipe structure, the system comprising:
    at least one flexible conduit configured to conform to a profile of a bend stiffener of a flexible pipe structure which bending curvature is to be monitored;
    the at least one flexible conduit including:
    one or more sensors configured for measuring a bending curvature of the flexible pipe structure; and
    a protective rod included in the at least one flexible conduit wherein the protective rod remains free to slide once included in the at least one conduit for ensuring that the bending of the flexible pipe structure is substantially transferred to the sensors of the conduit.

2. The system of claim 1, wherein the sensors comprise one or more fiber optic sensors and/or one or more accelerometers.

3. The system of claim 2, wherein each of the one or more fiber optic sensors includes one or more Fiber Bragg Gratings (FBGs).

4. The system of claim 3, wherein the FBGs measure bending strain at several axial stations along the protective rod with compensation for non-bending effects.

5. The system of claim 4, wherein the bending strain at each station is measured at a plurality of angular locations around a circumference of the protective rod via the one or more fiber optic sensors.

6. The system of claim 1, further comprising an interface pad disposed between the at least one conduit and the bend stiffener for ensuring that the bending of the bend stiffener is substantially transferred to the sensors of the conduit by providing a distance between the protective rod and a surface of the bend stiffener and by providing a contoured mating surface on the interface pad for coupling to the bend stiffener.

7. The system of claim 1, further comprising an openable and closable harness for housing the at least one flexible conduit, wherein the harness in a closed position conforms to the shape of the bend stiffener to ensure contact between the at least one flexible conduit and the bend stiffener.

8. The system of claim 7, wherein the harness includes upper and lower locking clamps conforming to upper and lower portions of the bend stiffener and with bands provided there between for accommodating the respective at least one flexible conduit.

9. The system of claim 8, wherein the harness includes straps configured to secure the bands around the bend stiffener.

10. A method for monitoring bending curvature of a flexible pipe structure, the method comprising the steps of:
    providing at least one flexible conduit configured to conform to a profile of a bend stiffener of a flexible pipe structure which bending curvature is to be monitored;
    providing in the at least one flexible conduit one or more sensors;
    a protective rod included in the at least one flexible conduit wherein the protective rod remains free to slide once included in the at least one conduit for ensuring that the bending of the flexible pipe structure is substantially transferred to the sensors of the conduit; and
    measuring with each sensor a bending curvature of the bend stiffener.

11. The method of claim 10, wherein the sensors comprise one or more fiber optic sensors and/or one or more accelerometers.

12. The method of claim 11, wherein each of the one or more fiber optic sensors includes one or more Fiber Bragg Gratings (FBGs).

13. The method of claim 12, wherein the FBGs measure bending strain at several axial stations along the protective rod with compensation for non-bending effects.

14. The method of claim 13, wherein the bending strain at each station is measured at a plurality of angular locations around a circumference of the protective rod via the one or more fiber optic sensors.

15. The method of claim 10, further comprising providing an interface pad disposed between the at least one flexible conduit and the bend stiffener for ensuring that the bending of the bend stiffener is substantially transferred to the sensors of the at least one flexible conduit by providing a distance between the protective rod and a surface of the bend stiffener and by providing a contoured mating surface on the interface pad for coupling to the bend stiffener.

16. The method of claim 10, further comprising providing an openable and closable harness for housing the conduits, wherein the harness in a closed position conforms to the shape of the bend stiffener to ensure contact between the at least one flexible conduit and the bend stiffener.

17. The method of claim 16, wherein the harness includes upper and lower locking clamps conforming to upper and lower portions of the bend stiffener and with bands provided there between for accommodating the at least one flexible conduit.

18. The method of claim 17, wherein the harness includes straps configured to secure the bands around the bend stiffener.

* * * * *